United States Patent
Chou

(10) Patent No.: US 7,973,939 B2
(45) Date of Patent: Jul. 5, 2011

(54) DIFFERENTIAL-PHASE POLARIZATION-SENSITIVE OPTICAL COHERENCE TOMOGRAPHY SYSTEM

(75) Inventor: Chien Chou, Taipei (TW)

(73) Assignee: Chien Chou, Pleasanton, CA (US)

( * ) Notice: Subject to any disclaimer, the term of this patent is extended or adjusted under 35 U.S.C. 154(b) by 219 days.

(21) Appl. No.: 12/482,966

(22) Filed: Jun. 11, 2009

(65) Prior Publication Data

US 2010/0067019 A1  Mar. 18, 2010

Related U.S. Application Data

(60) Provisional application No. 61/132,193, filed on Jun. 17, 2008.

(51) Int. Cl.
*G01B 9/02* (2006.01)
(52) U.S. Cl. .......................... 356/487; 356/479; 356/497
(58) Field of Classification Search .......... 356/484–491, 356/479, 497
See application file for complete search history.

(56) References Cited

U.S. PATENT DOCUMENTS

| | | | |
|---|---|---|---|
| 3,891,321 A * | 6/1975 | Hock | 356/488 |
| 6,327,037 B1* | 12/2001 | Chou et al. | 356/484 |
| 6,552,799 B1* | 4/2003 | Wright et al. | 356/497 |
| 2003/0103212 A1* | 6/2003 | Westphal et al. | 356/479 |
| 2003/0112444 A1* | 6/2003 | Yang et al. | 356/486 |
| 2006/0028652 A1* | 2/2006 | Chan et al. | 356/497 |

* cited by examiner

*Primary Examiner* — Tarifur Chowdhury
*Assistant Examiner* — Jonathon D Cook

(57) ABSTRACT

A differential-phase polarization-sensitive optical coherence tomography system includes a polarized heterodyne interferometer for generating a reference beam to be reflected by a movable mirror unit, and a signal beam to be reflected by an imaging plane in a specimen. The interferometer further generates a first electrical signal output corresponding to first linear polarized waves of the reference and signal beams, and a second electrical signal output corresponding to second linear polarized waves of the reference and signal beams. A differential amplifier receives the first and second electrical signal outputs, and generates a differential signal output therefrom. A data acquisition unit is used to measure amplitudes of the first and second electrical signal outputs and the differential signal output. A computing unit computes the amplitudes measured by the data acquisition unit to determine a reflectivity, a phase retardation, and a fast axis angle of the imaging plane in the specimen.

16 Claims, 1 Drawing Sheet

DIFFERENTIAL-PHASE POLARIZATION-SENSITIVE OPTICAL COHERENCE TOMOGRAPHY SYSTEM

CROSS-REFERENCE TO RELATED APPLICATION

This application claims priority of U.S. Provisional Patent Application No. 61/132,193, filed on Jun. 17, 2008.

BACKGROUND OF THE INVENTION

1. Field of the Invention

The present invention relates to a differential-phase polarization-sensitive optical coherence tomography system that is capable of obtaining three tomographic images indicating a reflectivity, a phase retardation, and a fast axis angle of a specimen simultaneously.

2. Description of the Related Art

Phase retardation between P and S waves and the orientation angle of fast axis (hereinafter referred to as fast axis angle) are two parameters defining linear birefringence properties of anisotropic materials. K. Schoenenberger et al. (Applied Optics 37, pages 6026-6036, 1998) proposed the use of a circularly polarized laser beam in conventional polarization-sensitive optical coherence tomography (PSOCT) to obtain the phase retardation in terms of a ratio of demodulated amplitudes of P-polarized and S-polarized heterodyne signals. However, the fast axis angle is not available in their setup. C. Hitzenberger et al. (Optics Express 9, pages 780-790, 2001) proposed a method to calculate the fast axis angle by means of a phase difference of the P-polarized and S-polarized heterodyne signals via Hilbert transformation. However, a limited sampling rate in Hilbert transformation decreases detection sensitivity of the PSOCT.

In U.S. Patent Application Publication No. US 2008/0309946, the applicant disclosed a differential-phase interferometric system suitable for optical coherence tomography. The interferometric system includes a polarized heterodyne interferometer generating first and second optical heterodyne electrical signal outputs. A differential amplifier receives the first and second optical heterodyne electrical signal outputs from the polarized heterodyne interferometer, and generates a differential signal output. A data acquisition unit receives the first and second optical heterodyne electrical signal outputs from the polarized heterodyne interferometer and the differential signal output from the differential amplifier, and measures amplitudes of the first and second optical heterodyne electrical signal outputs and the differential signal output. A computing unit, such as a personal computer, is operable to compute the amplitudes measured by the data acquisition unit to determine a phase difference between the first and second optical heterodyne electrical signal outputs.

The polarized heterodyne interferometer includes a light source module for generating a circularly polarized output beam, a beam splitter for splitting the circularly polarized output beam into a reference beam and a signal beam, a piezoelectric-supported mirror for reflecting the reference beam, a first polarization beam splitter for splitting the signal beam into P-polarization and S-polarization wave components, a scanning mirror for reflecting the S-polarization wave component, a lens through which the P-polarization wave component passes for refection by an imaging plane in a specimen, a second polarization beam splitter for receiving a combined output beam of the reference and signal beams from the beam splitter and for separating the combined output beam into mutually orthogonal linear-polarized first and second optical signals, i.e., P-polarized optical signal and S-polarized optical signal, and first and second photo detectors for detecting the first and second optical signals, respectively, so as to generate the first and second optical heterodyne electrical signal outputs, respectively.

It is noted that, in the aforesaid patent publication, control of the piezoelectric-supported mirror and the scanning mirror of the polarized heterodyne interferometer for simultaneous movement is required in order to obtain a tomographic image of an imaging plane at a certain depth of the specimen.

SUMMARY OF THE INVENTION

Therefore, an object of the present invention is to provide a differential-phase polarization-sensitive optical coherence tomography system that is capable of obtaining three tomographic images respectively indicating a reflectivity, a phase retardation and a fast axis angle of an imaging plane in a specimen simultaneously, and that is suitable for applications requiring high speed and high detection sensitivity.

According to this invention, there is provided a differential-phase polarization-sensitive optical coherence tomography system for measuring a specimen. The differential-phase polarization-sensitive optical coherence tomography system comprises:

a polarized heterodyne interferometer including
  a light source module operable to generate a circularly polarized output beam,
  a beam splitter for splitting the circularly polarized output beam into a circular polarized reference beam that includes two mutually orthogonal first and second linear polarized waves, and a circular polarized signal beam that includes two mutually orthogonal first and second linear polarized waves,
  a movable mirror unit for reflecting the reference beam back to the beam splitter and producing a Doppler frequency shift of the reference beam,
  the signal beam being directed to the specimen, being reflected by an imaging plane in the specimen back to the beam splitter, and containing measured information of the imaging plane in the specimen,
  the beam splitter further combining the reference beam reflected by the movable mirror unit and the signal beam reflected by the imaging plane in the specimen into a combined output beam,
  a first polarization beam splitter for separating the combined output beam from the beam splitter into mutually orthogonal linear-polarized first and second optical signals, the first optical signal corresponding to the first linear polarized waves of the signal and reference beams, the second optical signal corresponding to the second linear polarized waves of the signal and reference beams, and
  first and second photo detectors for detecting the first and second optical signals from the first polarization beam splitter, respectively, so as to generate a first optical heterodyne electrical signal output corresponding to the first optical signal, and a second optical heterodyne electrical signal output corresponding to the second optical signal, respectively;

a differential amplifier being coupled to the first and second photo detectors of the polarized heterodyne interferometer for receiving the first and second optical heterodyne electrical signal outputs therefrom, and generating a differential signal output therefrom;

a data acquisition unit being coupled to the first and second photo detectors of the polarized heterodyne interferometer and the differential amplifier for receiving the first and second optical heterodyne electrical signal outputs and the differential signal output therefrom, and for measuring amplitudes of the first and second optical heterodyne electrical signal outputs and the differential signal output; and a computing unit that is coupled to the data acquisition unit, and that is operable to compute the amplitudes measured by the data acquisition unit to determine at least one parameter corresponding to the measured information of the specimen.

BRIEF DESCRIPTION OF THE DRAWING

Other features and advantages of the present invention will become apparent in the following detailed description of the preferred embodiment with reference to the accompanying drawing, of which.

DETAILED DESCRIPTION OF THE PREFERRED EMBODIMENT

Figure 1:
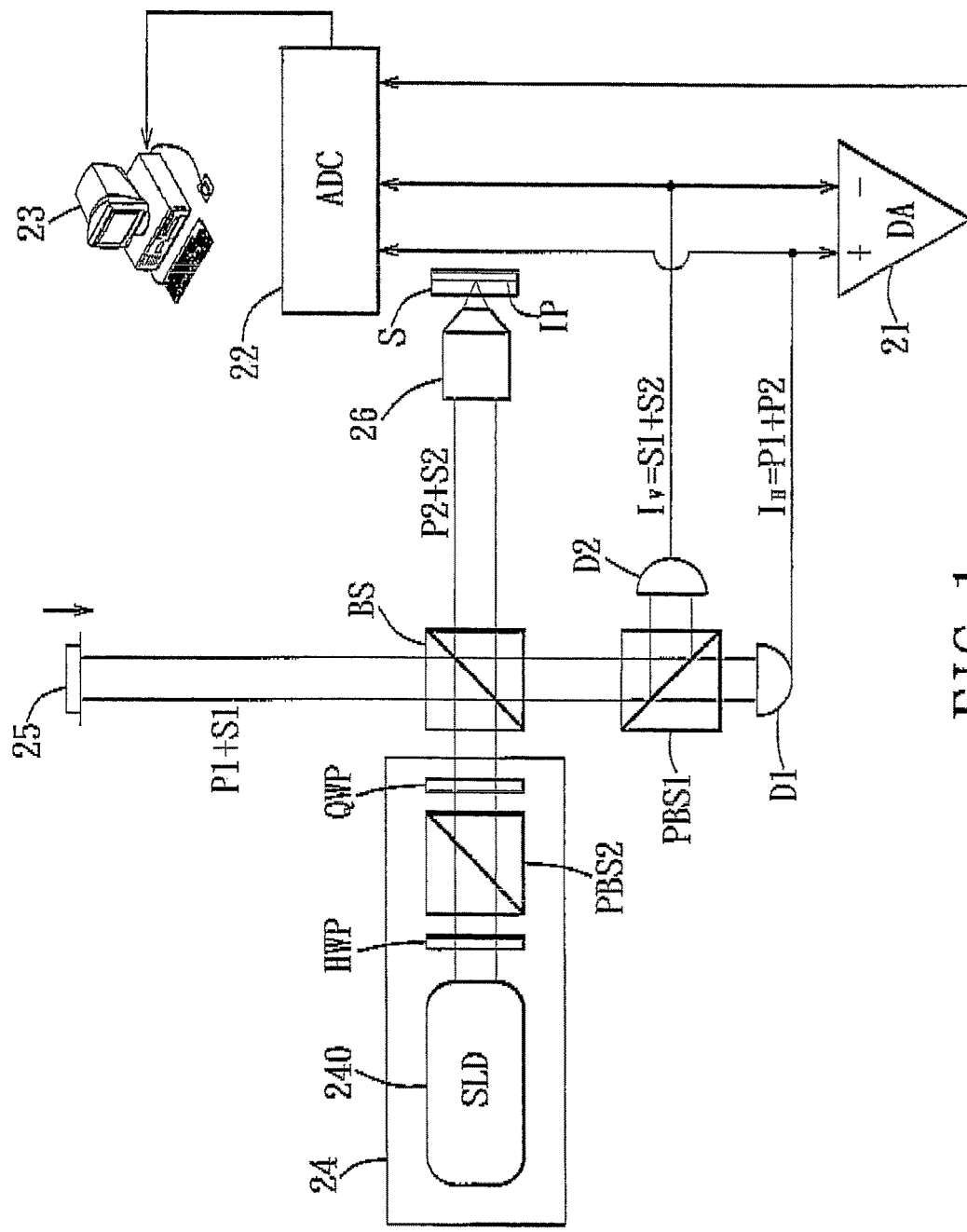
FIG. 1 is a block diagram of a preferred embodiment of a differential-phase polarization-sensitive optical coherence tomography system according to the present invention.

Referring to FIG. 1, the preferred embodiment of a differential-phase polarization-sensitive optical coherence tomography (DP-PSOCT) system according to the present invention is suitable for measuring optical characteristics of an anisotropic material or specimen (S), and includes a polarized heterodyne interferometer, a differential amplifier (DA) 21, a data acquisition unit 22 coupled to the differential amplifier 21, and a computing unit 23, such as a personal computer, coupled to the data acquisition unit 22. The polarized heterodyne interferometer includes a light source module 24, a beam splitter (BS), a movable mirror unit 25, a first polarization beam splitter (PBS1), a lens unit 26, and first and second photo detectors (D1, D2). The differential amplifier 21 and the data acquisition unit are both coupled to the first and second photo detectors (D1, D2). In this embodiment, the light source module 24 includes a broadband super luminescent diode (SLD) 240 employed as a low coherence light source emitting an elliptically polarized beam. The elliptically polarized beam passes in sequence through a half-wave plate (HWP), a second polarization beam splitter (PBS2), and a quarter-wave plate (QWP) to result in a circularly polarized output beam. It is noted that the half-wave plate (HWP) may be omitted in other embodiments of this invention.

During operation, the circularly polarized output beam from the light source module 24 is split by the beam splitter (BS) into a reference beam that includes two mutually orthogonal first and second linear polarized waves (P1, S1), and a signal beam that includes two mutually orthogonal first and second linear polarized waves (P2, S2). In this embodiment, the movable mirror unit 25 is a phase-modulating mirror unit, such as a piezoelectric-supported mirror, for reflecting the reference beam back to the beam splitter (BS) and producing a Doppler frequency shift of the reference beam. An electric field of the reference beam reflected by the movable mirror unit 25 is $$E_R = \left(\frac{R_m}{2}\right)^{1/2} E_0 \begin{pmatrix} 1 \\ i \end{pmatrix} \exp(-i2kl_r), \tag{1}$$

where $R_m$ is the reflectivity of the movable mirror unit 25, $E_0$ is an electric field of the circularly polarized output beam received by the beam splitter (BS), k is wave number, and $l_r$ is an optical path length between the beam splitter (BS) and the movable mirror unit 25.

The signal beam passes through the lens unit 26 to reach the specimen (S). In this embodiment, the lens unit 26 is a microscope objective having a numerical aperture of 0.40 and a magnification of 20×. Then, the signal beam is reflected by an imaging plane (IP) at a certain depth of the specimen back to the beam splitter (BS), and contains measured information of the imaging plane (IP) in the specimen (S). The beam splitter (BS) further combines the reference beam reflected by the movable mirror unit 25 and the signal beam reflected by the imaging plane (IP) in the specimen (S) into a combined output beam. An electric field of the signal beam reflected by the imaging plane (IP) can be represented by $$E_S = J_s J_s \left[\frac{R_s(d)}{2}\right]^{1/2} E_0 \begin{pmatrix} 1 \\ i \end{pmatrix} \exp(-i2kl_s), \tag{2}$$

where $R_s(d)$ is the reflectivity of the imaging plane (IP) at a certain depth d of the specimen (S), $l_s$ is an optical path length from the beam splitter (BS) to the specimen (S), and $J_s$ is Jones matrix of an anisotropic medium (Applied Optics 37, pages 6026-6036, 1998).

The first polarization beam splitter (PBS1) separates the combined output beam from the beam splitter (BS) into mutually orthogonal linear-polarized first and second optical signals. The first optical signal corresponds to the first linear polarized waves (P1, P2) of the signal and reference beams, and the second optical signal corresponds to the second linear polarized waves (S1, S2) of the signal and reference beams. The first photo detector (D1) detects the first optical signal from the first polarization beam splitter (PBS1) so as to generate a first optical heterodyne electrical signal output $I_H$. The second photo detector (D2) detects the second optical signal from the first polarization beam splitter (PBS1) so as to generate a second optical heterodyne electrical signal output $I_V$. The differential amplifier 21 receives the first and second optical heterodyne electrical signal outputs $I_H$, $I_V$ from the first and second photo detectors (D1, D2), and generates a differential signal output $\Delta I$ from the first and second optical heterodyne electrical signal outputs ($I_H$, $I_V$).

The data acquisition unit 22, which is an analog-to-digital converter (ADC) in this embodiment, receives the first and second optical heterodyne electrical signal outputs $I_H$, $I_V$ from the first and second photo detectors (D1, D2), and the differential signal output $\Delta I$ from the differential amplifier 21. The data acquisition unit 22 employs envelope detection to detect amplitudes of the first and second optical heterodyne electrical signal outputs $I_H$, $I_V$ and the differential signal output $\Delta I$. With reference to Optics Express 16, pages 12874-12858, 2008, the amplitudes of the first and second optical heterodyne electrical signal outputs ($I_H$, $I_V$) are expressed by $$I_H = \gamma P_0 [R_m R_s(d)]^{1/2} \exp\left\{-\left[\frac{2\Delta l(\ln 2)^{1/2}}{l_\omega}\right]^2\right\} [1 - \sin(2\delta)\sin(2\varphi)]^{1/2}, \tag{3}$$

$$I_V = \gamma P_0 [R_m R_s(d)]^{1/2} \exp\left\{-\left[\frac{2\Delta l(\ln 2)^{1/2}}{l_\omega}\right]^2\right\} [1 + \sin(2\delta)\sin(2\varphi)]^{1/2}, \tag{4}$$

where $\Delta l = l_s - l_r$, $\gamma$ is quantum efficiency of the first and second photo detectors (D1, D2), $P_0$ is the power of the light source module 24, $l_\omega$ is coherence length of the light source module

24, δ is a phase retardation of the imaging plane (PI) at the certain depth d of the specimen (S), and φ is a fast axis angle of the imaging plane (PI) at the certain depth d of the specimen (S).

According to Equations (3) and (4), the amplitude of the differential signal output ΔI from the differential amplifier (DA) 21 is obtained by a similar method described in Optics Express 16, pages 12847-12858, 2008, and can be represented by $$\Delta I = I_H - I_V \qquad (5)$$
$$= 2\gamma P_0 [R_m R_s(d)]^{1/2} \exp\left\{-\left[\frac{2\Delta l (\ln 2)^{1/2}}{l_\omega}\right]^2\right\} \sin(\delta).$$

The computing unit 23 computes the amplitudes measured by the data acquisition unit 22 to determine a reflectivity R, the phase retardation δ, and the fast axis angle φ of the imaging plane (IP) at the certain depth d in the specimen (S) corresponding to the measured information of the specimen. According to Equations (3) to (5), the reflectivity R, the phase retardation δ, and the fast axis angle φ can be represented by $$R = (I_V^2 + I_H^2)^{1/2} \qquad (6)$$

$$\delta = \sin^{-1}\left\{\frac{\Delta I}{[2(I_V^2 + I_H^2)]^{1/2}}\right\}, \text{ and} \qquad (7)$$

$$\varphi = \frac{1}{2}\sin^{-1}\left\{\frac{I_V^2 - I_H^2}{\Delta I[2(I_V^2 + I_H^2) - \Delta I^2]^{1/2}}\right\}. \qquad (8)$$

From Equations (6) to (8), it is evident that the phase retardation δ is independent of the fast axis angle φ in this invention. Therefore, by scanning the specimen (S) laterally, the computing unit 23 is further operable to simultaneously generate tomographic images indicating the reflectivity R, the phase retardation δ, and the fast axis angle φ, respectively. The tomographic image indicating the phase retardation δ is not influenced by the tomographic image indicating the fast axis angle φ.

In other embodiments, a broadband swept laser source can be employed in the light source module 24 of the polarized heterodyne interferometer instead of the broadband SLD 240.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A differential-phase polarization-sensitive optical coherence tomography (DP-PSOCT) system for measuring a specimen, comprising:
   a polarized heterodyne interferometer including
   a light source module operable to generate a circularly polarized output beam,
   a beam splitter for splitting the circularly polarized output beam into a circular polarized reference beam that includes two mutually orthogonal first and second linear polarized waves, and a circular polarized signal beam that includes two mutually orthogonal first and second linear polarized waves,
   a movable mirror unit for reflecting the reference beam back to said beam splitter and producing a Doppler frequency shift of the reference beam,
   the signal beam being directed to the specimen, being reflected by an imaging plane in the specimen back to said beam splitter, and containing measured information of the imaging plane in the specimen,
   said beam splitter further combining the reference beam reflected by said movable mirror unit and the signal beam reflected by the imaging plane in the specimen into a combined output beam,
   a first polarization beam splitter for separating the combined output beam from said beam splitter into mutually orthogonal linear-polarized first and second optical signals, the first optical signal corresponding to the first linear polarized waves of the signal and reference beams, the second optical signal corresponding to the second linear polarized waves of the signal and reference beams, and
   first and second photo detectors for detecting the first and second optical signals from said first polarization beam splitter, respectively, so as to generate a first optical heterodyne electrical signal output corresponding to the first optical signal, and a second optical heterodyne electrical signal output corresponding to the second optical signal, respectively;
   a differential amplifier being coupled to said first and second photo detectors of said polarized heterodyne interferometer for receiving the first and second optical heterodyne electrical signal outputs therefrom, and generating a differential signal output therefrom;
   a data acquisition unit being coupled to said first and second photo detectors of said polarized heterodyne interferometer and said differential amplifier for receiving the first and second optical heterodyne electrical signal outputs and the differential signal output therefrom, and for measuring amplitudes of the first and second optical heterodyne electrical signal outputs and the differential signal output; and
   a computing unit that is coupled to said data acquisition unit, and that is operable to compute the amplitudes measured by said data acquisition unit to determine at least one parameter corresponding to the measured information of the specimen.

2. The DP-PSOCT system as claimed in claim 1, wherein said polarized heterodyne interferometer further includes a lens unit through which the signal beam passes to reach the specimen.

3. The DP-PSOCT system as claimed in claim 1, wherein said light source module includes one of a broadband super luminescent diode, and a broadband swept laser source.

4. The DP-PSOCT system as claimed in claim 1, wherein said movable mirror unit is a phase-modulating mirror unit.

5. The DP-PSOCT system as claimed in claim 4, wherein said phase-modulating mirror unit is a piezoelectric-supported mirror.

6. The DP-PSOCT system as claimed in claim 1, wherein said data acquisition unit employs envelope detection to detect the amplitudes of the first and second optical heterodyne electrical signal outputs and the differential signal output.

7. The DP-PSOCT system as claimed in claim 1, wherein said data acquisition unit is an analog-to-digital converter.

8. The DP-PSOCT system as claimed in claim 1, wherein said at least one parameter determined by said computing unit includes a reflectivity R of the imaging plane in the specimen.

9. The DP-PSOCT system as claimed in claim 8, wherein said reflectivity R is obtained based upon the equation, $$R=(I_V^2+I_H^2)^{1/2},$$

wherein $I_H$ is the amplitude of the first optical heterodyne electrical signal output, and $I_V$ is the amplitude of the second optical heterodyne electrical signal output.

10. The DP-PSOCT system as claimed in claim 8, wherein said computing unit is further operable to generate a tomographic image indicating said reflectivity R.

11. The DP-PSOCT system as claimed in claim 1, wherein said at least one parameter determined by said computing unit includes a phase retardation δ of the imaging plane in the specimen.

12. The DP-PSOCT system as claimed in claim 11, wherein said phase retardation δ is obtained based upon the equation, $$\delta = \sin^{-1}\left\{\frac{\Delta I}{[2(I_V^2 + I_H^2)]^{1/2}}\right\},$$

wherein $I_H$ is the amplitude of the first optical heterodyne electrical signal output, $I_V$ is the amplitude of the second optical heterodyne electrical signal output, and ΔI is the amplitude of the differential signal output.

13. The DP-PSOCT system as claimed in claim 11, wherein said computing unit is further operable to generate a tomographic image indicating said phase retardation δ.

14. The DP-PSOCT system as claimed in claim 1, wherein said at least one parameter determined by said computing unit includes a fast axis angle φ of the imaging plane in the specimen.

15. The DP-PSOCT system as claimed in claim 14, wherein said fast axis angle φ is obtained based upon the equation, $$\varphi = \frac{1}{2}\sin^{-1}\left\{\frac{I_V^2 - I_H^2}{\Delta I[2(I_V^2 + I_H^2) - \Delta I^2]^{1/2}}\right\},$$

wherein $I_H$ is the amplitude of the first optical heterodyne electrical signal output, $I_V$ is the amplitude of the second optical heterodyne electrical signal output, and ΔI is the amplitude of the differential signal output.

16. The DP-PSOCT system as claimed in claim 14, wherein said computing unit is further operable to generate a tomographic image indicating said fast axis angle φ.

* * * * *